United States Patent
Takahashi et al.

(10) Patent No.: US 7,648,765 B2
(45) Date of Patent: Jan. 19, 2010

(54) DISPERSION OF CARBON NANOPARTICLES AND CORE-SHELL TYPE CARBON NANOPARTICLES, AND METHOD OF PREPARING THE SAME

(75) Inventors: Hisamitsu Takahashi, Chiba (JP); Fumiaki Kataoka, Chiba (JP); Shigeo Itoh, Chiba (JP)

(73) Assignee: Futaba Corporation, Chiba (JP)

( * ) Notice: Subject to any disclaimer, the term of this patent is extended or adjusted under 35 U.S.C. 154(b) by 163 days.

(21) Appl. No.: 11/703,084

(22) Filed: Feb. 7, 2007

(65) Prior Publication Data

US 2008/0032135 A1 Feb. 7, 2008

(30) Foreign Application Priority Data

Feb. 20, 2006 (JP) ............... 2006-042460

(51) Int. Cl.
- B32B 5/16 (2006.01)
- B01F 3/12 (2006.01)
- B01J 13/10 (2006.01)

(52) U.S. Cl. .................. 428/403; 427/212; 427/213.31; 428/404; 516/22; 516/23

(58) Field of Classification Search ................ 428/403, 428/404; 977/773; 516/22, 23; 427/212, 427/213.31
See application file for complete search history.

(56) References Cited

U.S. PATENT DOCUMENTS

| | | | |
|---|---|---|---|
| 5,770,172 A * | 6/1998 | Linehan et al. .......... 423/561.1 |
| 6,387,531 B1 * | 5/2002 | Bi et al. .................... 428/570 |
| 6,548,264 B1 * | 4/2003 | Tan et al. .................. 435/7.21 |
| 6,773,823 B2 * | 8/2004 | O'Connor et al. ........... 428/548 |
| 2003/0228249 A1 * | 12/2003 | Fujimura et al. ............ 423/446 |
| 2005/0208304 A1 * | 9/2005 | Collier et al. ............... 428/403 |
| 2005/0255313 A1 * | 11/2005 | Kyotani et al. ............. 428/338 |

OTHER PUBLICATIONS

Yang & Gao, "Preparation of Fluorescent SiO2 Particles with Single CdTe Nanocrystal Cores by the Reverse Microemulsion Method", Adv. Mater, 2005, 17, 2354-2357.*

Seeger et al, SiOx-coating of carbon nanotubes at room temperature, Chemical Physics Letters, 339 (2001) 41-46.*

Lee et al, Novel amphiphilic carbon black composite nanoparticles from Tempo-terminalted polymer and Tempo-terminated block copolymer grafted carbon black, Polymer 46 (2005) 5514-5523.*

Ebbesen, Wetting, filling and decorating carbon nanotubes, J. Phys. Chem. Solids, vol. 57, Nos. 6-8, pp. 951-955 (1996).*

* cited by examiner

*Primary Examiner*—H. (Holly) T Le
(74) *Attorney, Agent, or Firm*—Bacon & Thomas, PLLC

(57) ABSTRACT

A dispersion of carbon nanoparticles is prepared by monodispersing carbon nanoparticles in water droplets of a reverse micelle solution in which the water droplets are coated with amphiphilic molecules and dispersed in an organic solvent. In a method of preparing the dispersion of carbon nanoparticles, carbon nanoparticles and a monodispersion function material, e.g., ammonia, for imparting a polarity to surfaces of the carbon nanoparticles are added to the reverse micelle solution. The solution is then stirred, so that the carbon nanoparticles whose surfaces have the polarity are monodispersed in the water droplets of the reverse micelle solution. Further, a metal alkoxide is added to the solution and then stirring them, so that the surfaces of the carbon nanoparticles are coated with oxide of the metal.

11 Claims, 6 Drawing Sheets

DISPERSION OF CARBON NANOPARTICLES AND CORE-SHELL TYPE CARBON NANOPARTICLES, AND METHOD OF PREPARING THE SAME

FIELD OF THE INVENTION

The present invention relates to a dispersion of carbon nanoparticles, in which carbon nanoparticles, such as nanodiamonds, are monodispersed in the water droplets of a reverse micelle solution, a preparation method thereof, core-shell type carbon nanoparticles coated with an metal oxide, prepared by using such a dispersion of carbon nanoparticles, and a method of preparing the same.

BACKGROUND OF THE INVENTION

Generally, nanodiamonds, which are very small diamond particles having a size of several nm, are prepared by exploding a mixture of TNT and hexogen in an inert medium, such as $CO_2$, an inert gas or water, to synthesize a diamond aggregate (an explosion process), which is then milled by using a bead mill.

Since such nanodiamonds have a high refractive index and are highly transparent, they are expected to be useful as optical material, and are also being considered for application as a polishing agent thanks to the high hardness thereof. In addition, nanodiamonds may be applied to various industrial fields thanks to their nanoparticle properties.

However, since the surfaces of nanodiamond particles are hydrophilic, the nanodiamonds cannot be dispersed in hydrocarbon solvents (heptane, decane, etc.) and almost all organic solvents, and also an epoxy resin. Further, nano-materials, such as nano-carbon, including the nanodiamonds, may easily aggregate, so that it is difficult to realize their special properties as nano-materials. For example, the nanodiamonds are expected to be industrially used as a polishing agent thanks to the high hardness thereof, and as an optical material for the high transparency or high refractive index thereof, but the applicability thereof is limited by the above-mentioned problems.

SUMMARY OF THE INVENTION

It is, therefore, an object of the present invention to make it possible to use carbon nanoparticles, such as nanodiamond particles, in various applications using the inherent properties of nanoparticles, by modifying the surfaces of carbon nanoparticles to allow the carbon nanoparticles to be monodispersed in a solvent and then coating the carbon nanoparticles with a film, so that the nanoparticles can be dispersed in or combined with various organic solvents or resins.

In accordance with an aspect of the present invention, there is provided a dispersion of carbon nanoparticles, prepared by monodispersing carbon nanoparticles in water droplets of a reverse micelle solution in which the water droplets are coated with amphiphilic molecules and dispersed in an organic solvent.

Since the dispersion of carbon nanoparticles is in a state in which carbon nanoparticles are monodispersed in the water droplets of the reverse micelle solution, it is possible to easily coat the carbon nanoparticles monodispersed with a metal oxide through a sol-gel process.

In accordance with another aspect of the present invention, there is provided a method of preparing a dispersion of carbon nanoparticles, including: adding carbon nanoparticles and a monodispersion function material for imparting a polarity to surfaces of the carbon nanoparticles, to a reverse micelle solution in which water droplets are coated with amphiphilic molecules and dispersed in an organic solvent, and then stirring them, so that the carbon nanoparticles whose surfaces have the polarity are monodispersed in the water droplets of the reverse micelle solution.

With such a method, since the carbon nanoparticles have surfaces imparted with the polarity by the monodispersion function material and become easily introduced into the water droplets in the reverse micelle solution, the carbon nanoparticles can be easily monodispersed in the water droplets of the reverse micelle solution.

In accordance with still another aspect of the present invention, there is provided a core-shell type carbon nanoparticle, wherein the carbon nanoparticle is coated with a metal oxide.

In the core-shell type carbon nanoparticles, since the surfaces of the carbon nanoparticles are modified by the coating with the metal oxide, the carbon nanoparticles can be easily dispersed in an organic solvent or resin, and therefore their inherent properties and functions as nanoparticles can be sufficiently exhibited in industrial applications. For example, the core-shell type carbon nanoparticles can be obtained by introducing the carbon nanoparticles into the water droplets of the reverse micelle solution to be monodispersed, and then coating the surfaces of the carbon nanoparticles monodispersed with the metal oxide.

In accordance with still another aspect of the present invention, there is provided a method of preparing core-shell type carbon nanoparticles, including: adding carbon nanoparticles and a monodispersion function material for imparting a polarity to surfaces of the carbon nanoparticles, to a reverse micelle solution in which water droplets are coated with amphiphilic molecules and dispersed in an organic solvent, and then stirring them, so that the carbon nanoparticles whose surfaces have the polarity are monodispersed in the water droplets of the reverse micelle solution; and adding a metal alkoxide to the solution and then stirring them, so that the surfaces of the carbon nanoparticles are coated with oxide of the metal.

With such a method of preparing the core-shell type carbon nanoparticles, the carbon nanoparticles whose surfaces are imparted with the polarity can be easily monodispersed in the water droplets of the reverse micelle solution and the surfaces of such carbon nanoparticles can be coated with the metal oxide by using the metal alkoxide, thereby making it possible to modify the surfaces of the nanoparticles. Therefore, core-shell type carbon nanoparticles can be prepared as industrial material capable of effectively using their inherent properties and functions as nanoparticles.

Further, in the present invention, the carbon nanoparticles include nano-carbon, such as fullerenes or tubes, as well as the nanodiamonds.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Figure 1:
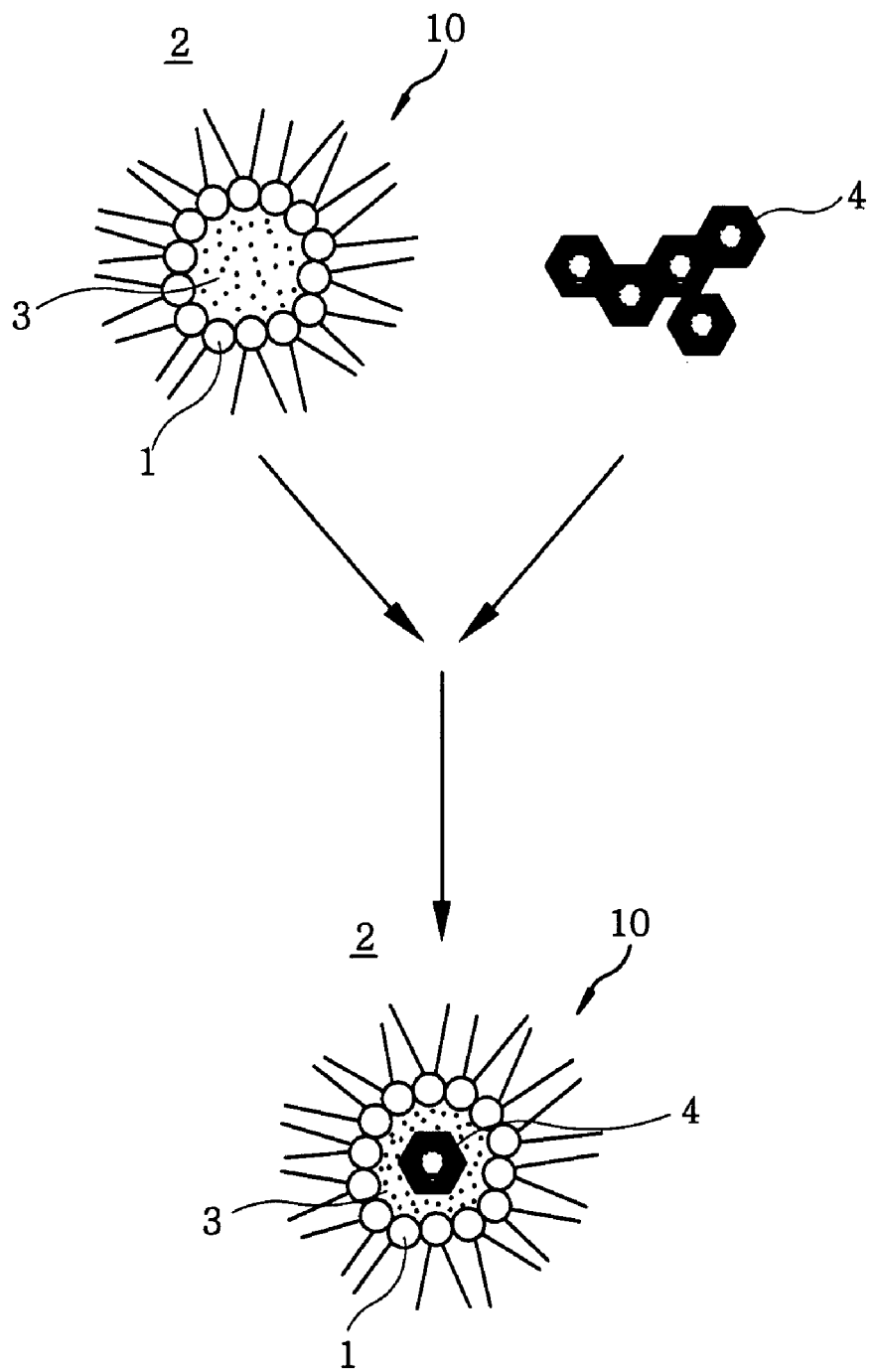
FIG. 1 schematically illustrates a process of monodispersing nanodiamond particles in a reverse micelle solution.

Hereinafter, the embodiments of the present invention will be described with reference to FIGS. 1 to 6.

The present inventors have studied to effectively use the properties and functions of diamond particles as carbon nanoparticles and found that, when the surfaces of the nanoparticles are coated with a metal oxide to change the surface properties, the nanoparticles can be dispersed even in a solvent known to date that they cannot be dispersed therein.

However, in order to form a metal oxide film on the surfaces of the nanoparticles, it is required a difficult process of monodispersing nanodiamonds which easily aggregate, and then coating the metal oxide film on the respective monodispersed nanoparticles in such a state.

As the results of studying the process, the present inventors have developed a manufacturing method of monodispersing nanodiamond particles (or to a state similar to the monodispersion) by using a reverse micelle method and then forming a metal film on the monodispersed nanodiamonds.

Hereinafter, there will be described in detail a dispersion of carbon nanoparticles in accordance with the present invention and a preparation method thereof, and core-shell type carbon nanoparticles and a preparation method thereof. In this embodiment, nanodiamonds are exemplified as carbon nanoparticles.

1. Dispersion of Nanodiamonds in Reverse Micelle Solution

1) A colloidal solution was prepared, which contains nanodiamonds of 10 wt % with respect to water.

2) Preparation of Reverse Micelle Solution 37.3 g of a di-2-ethylhexyl sodium sulfosuccinate (AOT) surfactant, as an amphiphilic molecule, and 350 cm³ of heptane, as an organic solvent, were each weighed and then placed into a beaker, after which a stirrer was placed into the beaker and a stirring process was performed for 10 min. Further, the solution was stirred for 30 min using a homogenizer. In this way, a reverse micelle solution that is a molecular aggregate in which the hydrophilic group of the surfactant was oriented inward in the organic solvent. As will be described in the following process, when the reverse micelle solution is added with water and stirred, nanoscale water droplets are formed in the reverse micelle solution, wherein water is soluble. Such nanoscale water droplets are referred to as water droplets of reverse micelles hereinafter.

3) Preparation of Nanodiamond Reverse Micelle Solution

The reverse micelle solution and the nanodiamond solution (the aforementioned colloidal solution), prepared as above, were added according to the compositions shown in Table 1 below, and each of them was stirred for one hour by using a stirrer to prepare three samples (referred to as Nos. 1, 2 and 3 in the present experiment). The spectral transmittance of each sample was measured and the dispersion state of nanodiamonds was evaluated.

TABLE 1

| Nanodiamond reverse micelle solution | Reverse micelle solution | Nanodiamond solution |
|---|---|---|
| 1 | 10.0 g | 5.0 µl |
| 2 | 10.0 g | 10.0 µl |
| 3 | 10.0 g | 20.0 µl |

As illustrated in FIG. 1, such a solution has a structure in which nanoscale water droplets 3 are confined in a reverse micelle solution 10 as a molecular aggregate, where the hydrophilic groups of AOT (surfactant) 1 are oriented inward in an organic solvent 2 and nanodiamonds 4 are introduced in a monodispersion state into the water droplets 3.

The spectral transmittance of the solution was measured. Further, up to the wavelength of 350 nm, the transmittance of incident light was low due to reflections or the like. Accordingly, in the present measurement, incident light within the wavelength range from 350 nm to 1100 nm was measured.

Figure 3:
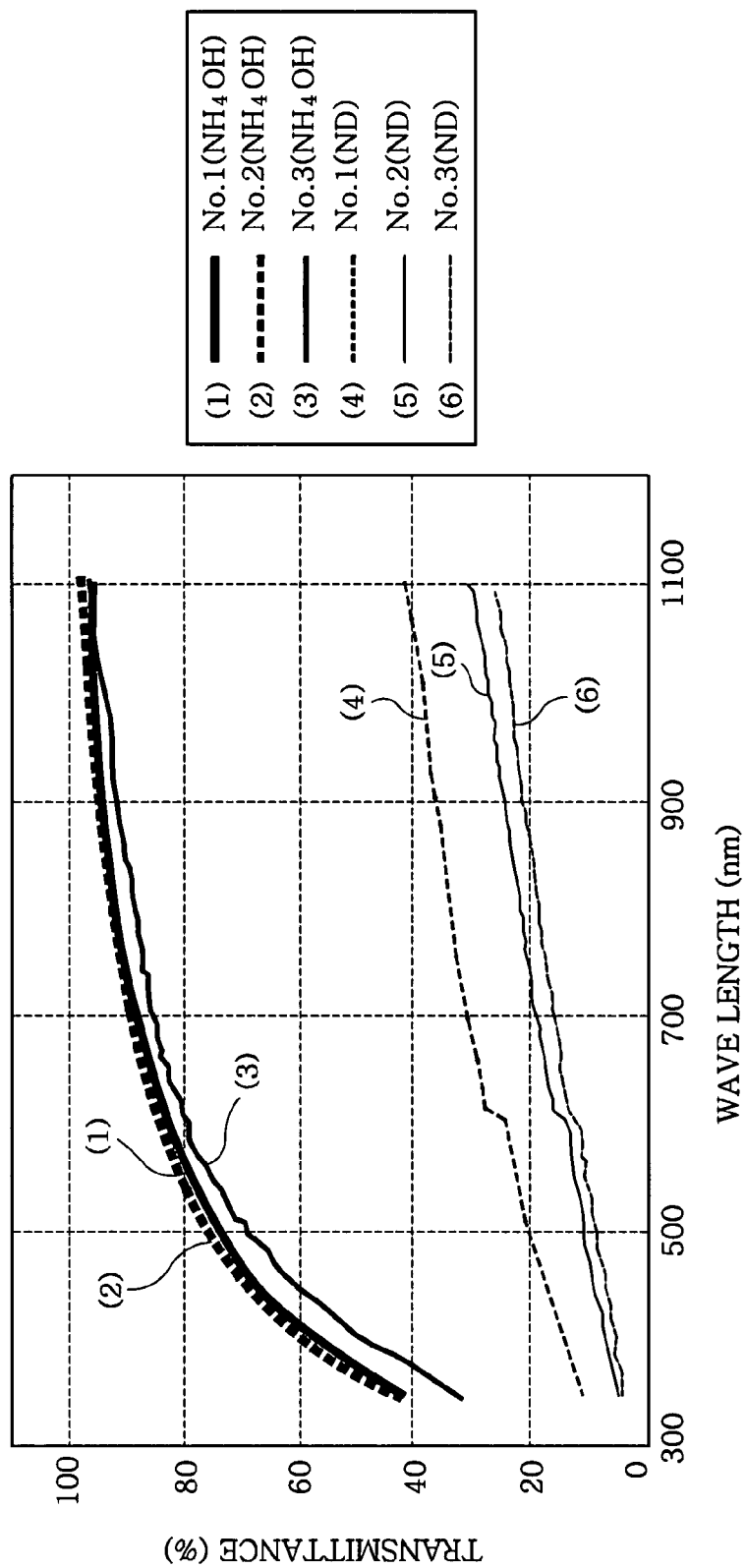
FIG. 3 illustrates the transmittance of the reverse micelle solution in which the nanodiamonds are monodispersed.

As can be seen from (4) No. 1 (ND), (5) No. 2 (ND), and (6) No. 3 (ND) of FIG. 3, the spectral transmittance of the solution obtained by adding the water dispersion of nanodiamonds to the reverse micelle solution was measured to be about 30%, which is not high, in the visible light range. It is believed that this is because nanodiamonds were not completely dispersed while they were introduced into the reverse micelle to a certain degree.

Then, 50 µl of ammonia water was added to the solution and it was stirred for 10 min. The spectral transmittance of the solution thus obtained was measured similarly. As can be seen from (1) No. 1 ($NH_4OH$), (2) No. 2 ($NH_4OH$) and (3) No. 3 ($NH_4OH$) of FIG. 3, in the case where ammonia water was added, the transmittance at 700 nm was high, about 80%.

Accordingly, by adding ammonia water, the nanodiamonds are considered to be monodispersed in the water droplets of the reverse micelle solution. It is believed that this is because the surfaces of the nanodiamond particles were imparted with positive or negative polarity by the ammonia and therefore the nanodiamond particles were easily monodispersed in the water droplets of the reverse micelle solution.

In such a case, the material having the function for imparting the surfaces of nanodiamond particles with polarity to allow them to be easily monodispersed in the water droplets of the reverse micelle solution (monodispersion function material) is not limited to the ammonia, and an acid, an alkali or any electrolyte may be added and stirred, which also makes it possible to impart the surfaces of the nanodiamond particles to allow them to be easily monodispersed in the water droplets of the reverse micelle solution.

2. Preparation of Nanodiamonds Coated With $SiO_2$ as Core-Shell Type Nanodiamond particles As mentioned above, in case nanodiamond particles are monodispersed in a reverse micelle solution, it becomes possible to coat the surfaces of the nanodiamond particles monodispersed with a metal oxide.

(Preparation of TEOS Solution)

Figure 2:
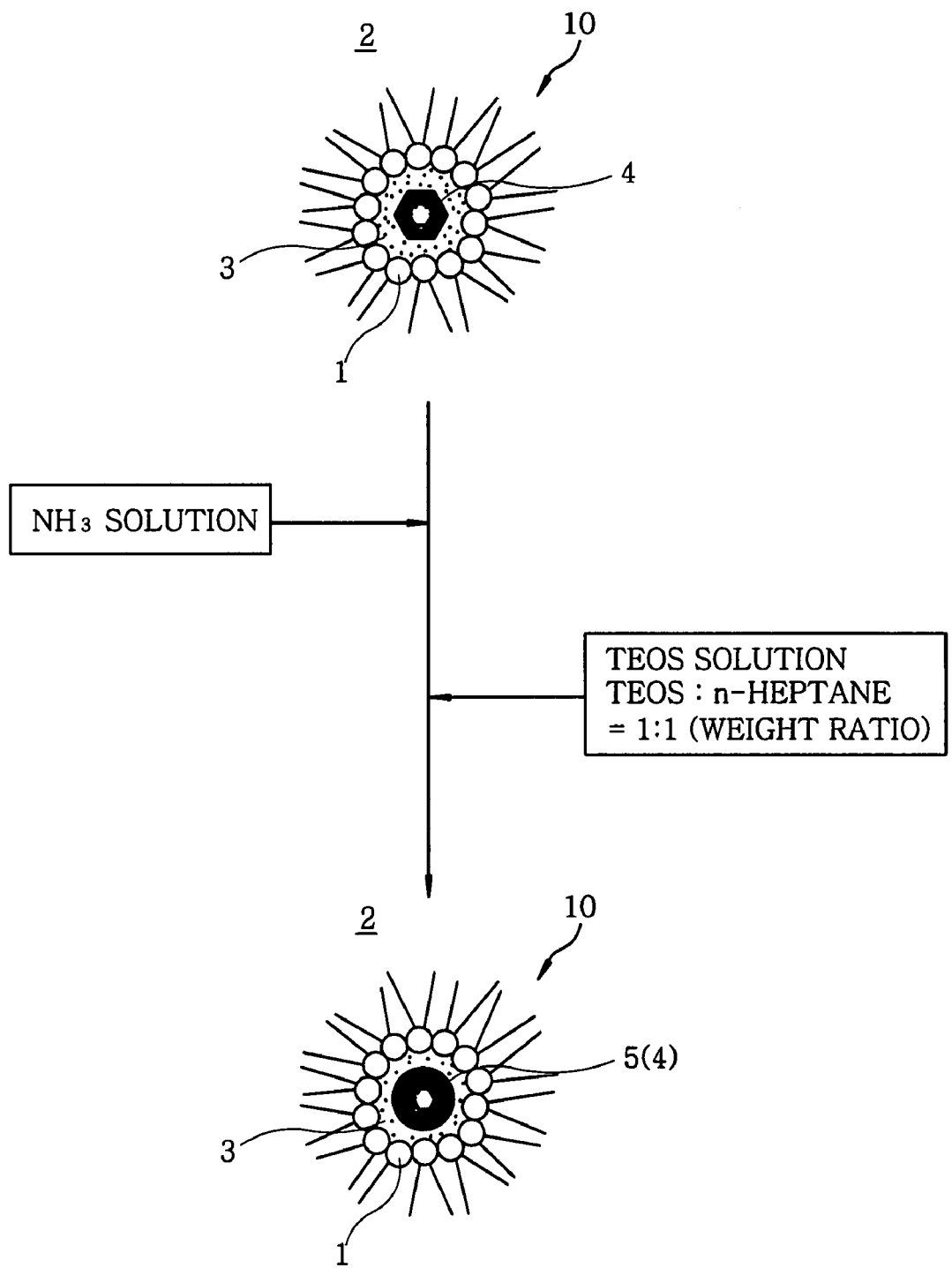
FIG. 2 schematically shows a process of adding an aqueous ammonia solution and a TEOS solution to the dispersion of nanodiamonds in the reverse micelle solution so as to coat the monodispersed nanodiamond particles with $SiO_2$.

As illustrated in FIG. 2, 10 ml of tetramethoxysilane (TEOS, $Si(OC_2H_5)_4$) as a metal alkoxide, and 10 ml of heptane were placed into a glass bottle, after which a stirrer was placed therein and the glass bottle was plugged, and then a stirring process was performed for 10 min. The reverse micelle solution (No. 1 ($NH_4OH$) to No. 3 ($NH_4OH$)), in which nanodiamonds 4 obtained in the above ammonia-adding process 3) were monodispersed, was stirred, after which 100 µl of the TEOS solution was added thereto and the solution was stirred for 30 min in a closed state. In this way, there are obtained SiO$_2$-coated nanodiamonds 5 in which the nanodiamonds 4 monodispersed in the water droplets of the reverse micelle solution 10 were coated with SiO$_2$.

(Measurement of Spectral Transmittance)

Figure 4:
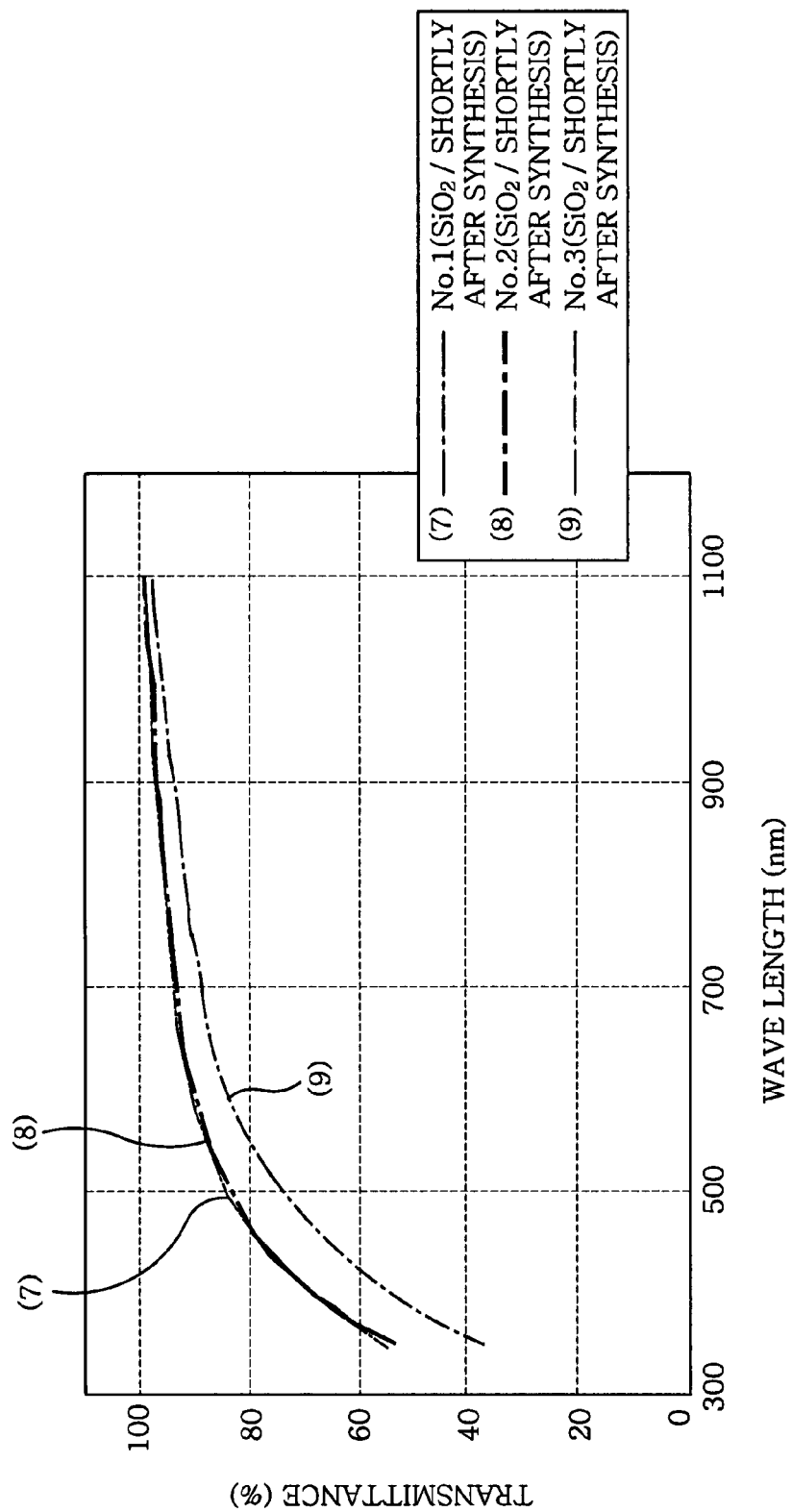
FIG. 4 illustrates the transmittance shortly after synthesis of the reverse micelle solution in which the nanodiamond particles coated with $SiO_2$ are monodispersed.

The spectral transmittances of the solutions thus obtained were measured. The spectral transmittances measured shortly after synthesis are shown in FIG. 4. Three kinds of data were obtained, that is, (7) No. 1 of SiO$_2$ (shortly after synthesis), (8) No. 2 of SiO$_2$ (shortly after synthesis) and (9) No. 3 of SiO$_2$ (shortly after synthesis).

Figure 5:
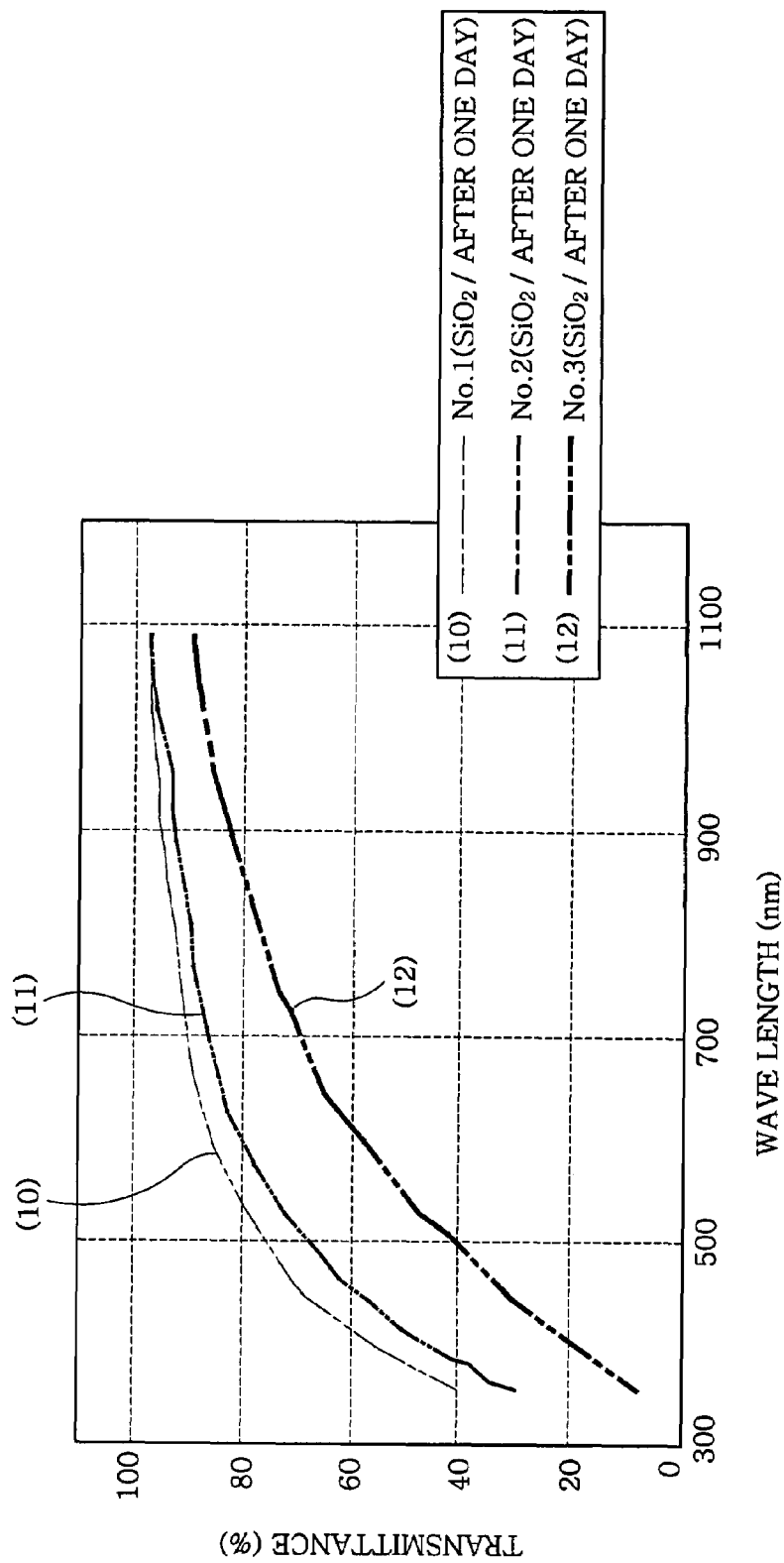
FIG. 5 shows the transmittance one day after synthesis of the reverse micelle solution in which the nanodiamond particles coated with $SiO_2$ are monodispersed.

Further, the spectral transmittances of the solutions measured one day after synthesis are shown in FIG. 5. Three kinds of data were obtained from, that is, (10) No. 1 of SiO$_2$ (after one day), (11) No. 2 of SiO$_2$ (after one day) and (12) No. 3 of SiO$_2$ (after one day).

Although the transmittance was increased shortly after SiO$_2$ coating, it tended to decreased after one day. This indicates that the bonding structure of SiO—SiO— was grown on the surfaces of nanodiamond particles due to the hydrolysis of tetramethoxysilane. Accordingly, by using a reverse micelle method, the surfaces of the nanodiamonds could be coated with silica.

3. Powdering of Nanodiamonds Coated with SiO$_2$

The nanodiamonds coated with SiO$_2$, which are present in the reverse micelle solution through the processes described above, are dried and powdered for industrial use without being aggregated. If the reverse micelle solution is dried as it is, the nanodiamonds coated with SiO$_2$ are aggregated. Therefore, while the reverse micelle solution is heated to evaporate the organic solvent, water is added thereto to substitute water for the organic solvent. Further, such a substitution process may be performed in a sequence of adding water and then heating to evaporate the organic solvent. Subsequently, water is removed through a freeze-drying process to obtain powders of nanodiamonds coated with SiO$_2$.

Figure 6:
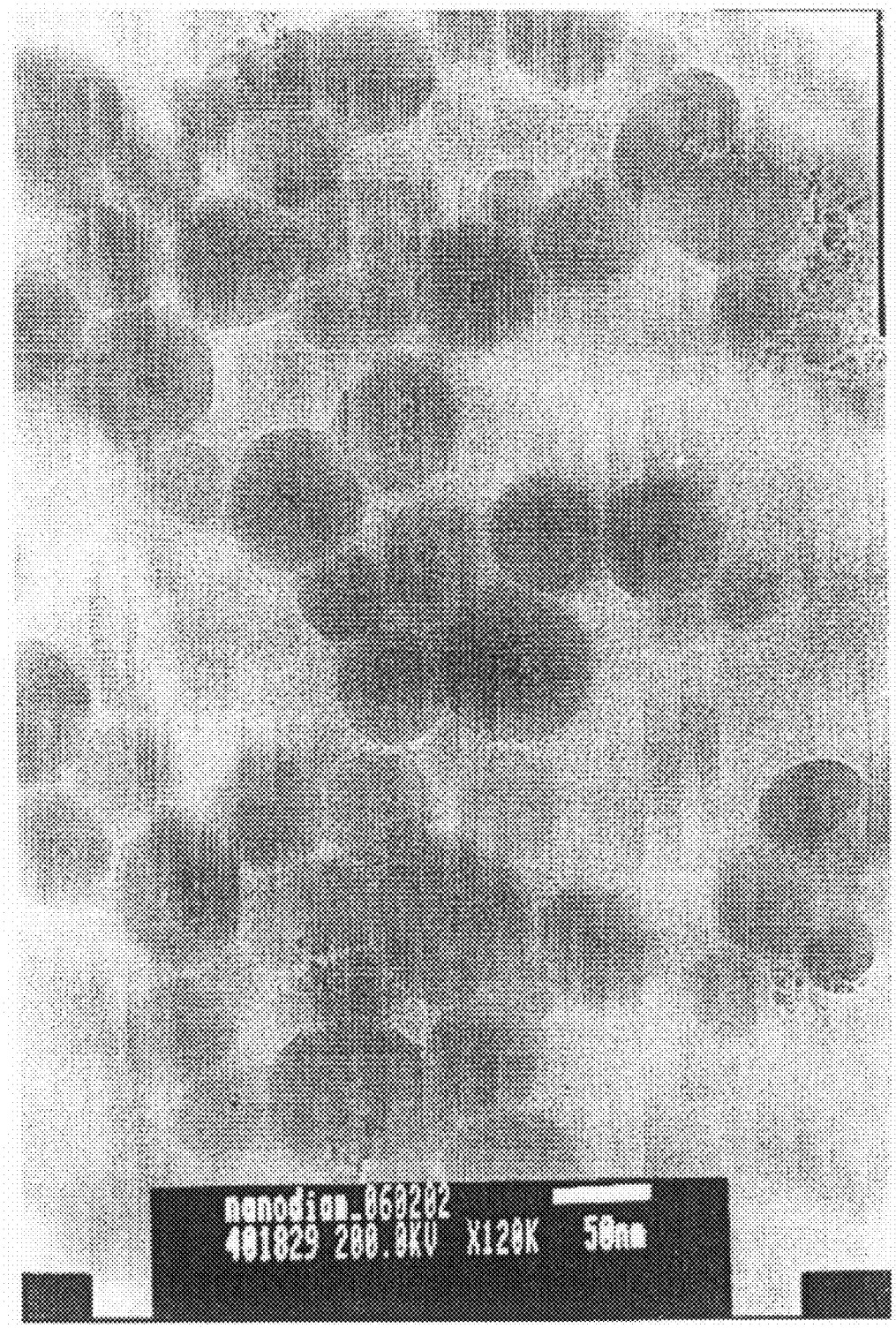
FIG. 6 is a magnified photograph of nanodiamond particles coated with $SiO_2$, taken by using a TEM (transmission electron microscope).

FIG. 6 is a (120,000 times magnified) photograph of the powders of nanodiamonds coated with SiO$_2$, taken by using a TEM (transmission electron microscope). The nanodiamonds coated with SiO$_2$ were obtained from the reverse micelle solution prepared through the aforementioned processes and then allowed to stand for one day or longer, and the thickness of SiO$_2$ on the nanodiamonds was about 50 nm. In this state, though the transmittance is lower than that shortly after synthesis as described above, but it is not decreased to the extent that the properties of nanodiamonds cannot be effectively used, and the nanodiamonds have a sufficient industrial value in use. If the SiO$_2$ has a thickness of several nm, the transmittance may be further increased.

4. Other Embodiments

In the above embodiment, SiO$_2$ is exemplified as the metal oxide to be coated on the nanodiamonds, but the surfaces of the nanodiamond particles may be coated with another metal oxide such as TiO$_2$, Al$_2$O$_3$, Y$_2$O$_3$, SnO$_2$, In$_2$O$_3$ or ZnO by using a metal alkoxide of the corresponding metal through a sol-gel process. Further, as the monodispersion function material for imparting polarity to the surfaces of nanodiamond particles to allow them to be monodispersed in the water droplets of the reverse micelle solution, an acid or alkali or any electrolyte as mentioned in the aforementioned processes may be used instead of the ammonia.

5. Effects of Embodiments

In accordance with the above embodiments, the following effects can be obtained.

1) Nanodiamond particles can be monodispersed in a reverse micelle solution. Such a dispersion is substantially transparent with respect to visible light (FIG. 3).

2) The nanodiamond particles monodispersed in the reverse micelle solution can be coated with a metal oxide, such as SiO$_2$, TiO$_2$, Al$_2$O$_3$, Y$_2$O$_3$, SnO$_2$, In$_2$O$_3$, ZnO or the like. Since the metal oxide is easy to disperse in an organic solvent or resin, core-shell type nanodiamonds coated with the metal oxide can be dispersed in the organic solvent or resin.

3) Since the nanodiamond particles monodispersed in the reverse micelle solution can be coated with SiO$_2$, it is possible to disperse such nanodiamonds in an organic solvent or resin.

4) When the nanodiamond particles coated with SiO$_2$ are dispersed in an epoxy resin, they have a refractive index between the refractive index (about 2.4) of nanodiamonds and the refractive index (about 1.4) of SiO$_2$ depending on the volume ratio of nanodiamonds and SiO$_2$, and thus the refractive index thereof becomes higher than that of the epoxy resin. Accordingly, when an epoxy resin in which nanodiamond particles coated with SiO$_2$ are dispersed is coated on the surface of LED, light can be efficiently emitted from the LED.

5) The nanodiamonds coated with SiO$_2$ can block UV light of 350 nm or less. Thus, when the nanodiamonds coated with SiO$_2$ are applied on surfaces of films, other transparent resins or glasses, they function to block UV light (FIGS. 4 and 5).

6) Since metal oxides, such as Sio$_2$, TiO$_2$, Al$_2$O$_3$, Y$_2$O$_3$, SnO$_2$, In$_2$O$_3$, ZnO and the like, are conductive, the core-shell type nanodiamonds coated with the conductive metal oxide can be used as conductive materials.

7) Carbon nanoparticles, other than the nanodiamond particles, can be used in various applications using the properties thereof.

While the invention has been shown and described with respect to the preferred embodiments, it will be understood by those skilled in the art that various changes and modifications may be made without departing from the spirit and scope of the invention as defined in the following claims.

What is claimed is:

1. A dispersion of carbon nanoparticles, prepared by monodispersing carbon nanoparticles in water droplets of a reverse micelle solution in which the water droplets are coated with amphiphilic molecules and dispersed in an organic solvent, wherein a monodispersion function material is added to the reverse micelle solution, and the monodispersion function material is an electrolyte.

2. A method of preparing a dispersion of carbon nanoparticles, comprising: adding carbon nanoparticles and a monodispersion function material for imparting a polarity to surfaces of the carbon nanoparticles, to a reverse micelle solution in which water droplets are coated with amphiphilic molecules and dispersed in an organic solvent, and then stirring them, so that the carbon nanoparticles whose surfaces have the polarity are monodispersed in the water droplets of the reverse micelle solution.

3. The dispersion of carbon nanoparticles of claim 1, wherein the electrolyte is an acid or an alkali.

4. A method of preparing a dispersion of carbon nanoparticles, comprising: adding carbon nanoparticles and a monodispersion function material for imparting a polarity to surfaces of the carbon nanoparticles, to a reverse micelle solution in which water droplets are coated with amphiphilic molecules and dispersed in an organic solvent, and then stirring them, so that the carbon nanoparticles whose surfaces have the polarity are monodispersed in the water droplets of the reverse micelle solution, wherein the monodispersion function material is an electrolyte.

5. The method of preparing a dispersion of carbon nanoparticles of claim 4, wherein the electrolyte is an acid or an alkali 6. The method of preparing a dispersion of carbon nanoparticles of claim 4, wherein the electrolyte is ammonia water.

7. A method of preparing core-shell type carbon Nanoparticles, comprising:

adding carbon nanoparticles and a monodispersion function material for imparting a polarity to surfacesof the carbon nanoparticles, to a reverse micelle solution in which water droplets are coated with amphiphilic molecules and dispersed in an organic solvent, and then stirring them. so that the carbon nanoparticles whose surfaces have the polarity are monodispersed in the water droplets of the reverse micelle solution; and adding metal alkoxide to the solution and then stirring them, so that the surfaces of the carbon nanoparticles are coated with oxide of the metal, wherein the monodispersion function material is an electrolyte.

8. The method of preparing core-shell type carbon nanoparticles of claim 7, wherein the electrolyte is an acid or an alkali.

9. The method of preparing core-shell type carbon nanoparticles of claim 7, wherein the electrolyte is ammonia water.

10. The method of preparing core-shell type carbon nanoparticles of claim 7, wherein the oxide is $SiO_2$, $TiO_2$, $Al_2Y_2O_3$, $SnO_2$, $In_2$, $In_2O_3$ or ZnO.

11. The method of preparing core-shell type carbon nanoparticles of claim 7, wherein the metal alkoxide is tetramethoxsyilane, and the oxide is $SiO_2$.

* * * * *